United States Patent [19]
Brückner et al.

[11] Patent Number: 5,050,178
[45] Date of Patent: Sep. 17, 1991

[54] MULTICHANNEL PSEUDO-SPARK SWITCH AND EXCITATION CIRCUIT FOR GAS LASERS HAVING THE SWITCH

[75] Inventors: Volker Brückner, Mömbris; Willi Bette, Erlangen; Dirk Friede, Goldbach; Hans-Jürgen Cirkel, Uttenreuth, all of Fed. Rep. of Germany

[73] Assignee: Siemens Aktiengesellschaft, Munich, Fed. Rep. of Germany

[21] Appl. No.: 604,829

[22] Filed: Oct. 26, 1990

Related U.S. Application Data

[63] Continuation of Ser. No. DE89/00266, Apr. 26, 1989.

[30] Foreign Application Priority Data

Apr. 26, 1988 [DE] Fed. Rep. of Germany ....... 3814050
Nov. 15, 1988 [DE] Fed. Rep. of Germany ....... 3838723

[51] Int. Cl.$^5$ ............................................. H01S 3/00
[52] U.S. Cl. ...................................... 372/38; 372/86; 372/87; 372/85; 372/83
[58] Field of Search ................... 372/38, 55, 83, 87, 372/85, 86

[56] References Cited

U.S. PATENT DOCUMENTS

| | | | |
|---|---|---|---|
| 4,521,889 | 6/1985 | Cirkel et al. | 372/38 |
| 4,573,160 | 2/1986 | Cirkel et al. | 372/38 |
| 4,630,277 | 12/1986 | Cirkel et al. | 372/38 |
| 4,635,267 | 1/1987 | Cirkel et al. | 372/38 |
| 4,663,568 | 5/1987 | Cohn | 372/38 |
| 4,698,819 | 10/1987 | Hirth et al. | 372/86 |

FOREIGN PATENT DOCUMENTS 0152605 8/1985 European Pat. Off. .
2098389 11/1982 United Kingdom .

OTHER PUBLICATIONS

Mechtersheimer et al., "Multichannel Pseudo-Spark Switch (WPS)"; J. Phys. E. Sci. Inst., 20, (1987).
Mechtersheimer et al., "High Repetition Rate, Fast Current Rise, Pseudo-Spark Switch", J. Phys. E. Sci. Inst., 19, (1986).
G. Mechtersheimer, R. Kohler et al., Journal Phys. E. 19/1986, 466-470.
G. Mechtersheimer, R. Kohler et al., Journal Phys. E. 20/1987, 270-273.
Conference Paper, V. E. Boggasch, H. Riege et al.: Proc. of the 5th IEEE Pulsed Power Conf., Arlington, 6/1985, 820-823.

Primary Examiner—Leon Scott, Jr.
Attorney, Agent, or Firm—Herbert L. Lerner; Laurence A. Greenberg

[57] ABSTRACT

An excitation circuit for TE lasers serves to generate a homogeneous high pressure glow discharge between laser electrodes within a gas space of a laser chamber. A fast acting high voltage switch of a pulse forming network is a multi-channel pseudo-spark switch and is preferably integrated with the laser. The switch is formed of a parallel circuit including a number of individual pseudo-spark switches with gaps. The total multi-channel pseudo-spark switch is filled with an ionizable low pressure gas filling at a given pressure. Voltage is applied to the anode and the cathode in such a way that the resulting gas discharge is located on the left-hand branch of the Paschen curve. The switch of the excitation circuit can also be used as a separate structural element for triggering an electrical high voltage switch circuit, and also for so-called flat plane laser systems.

13 Claims, 7 Drawing Sheets

MULTICHANNEL PSEUDO-SPARK SWITCH AND EXCITATION CIRCUIT FOR GAS LASERS HAVING THE SWITCH

CROSS-REFERENCE TO RELATED APPLICATION

This application is a continuation of International Application Ser. No. PCT/DE89/00266, filed Apr. 26, 1989.

The invention relates to an excitation circuit for gas lasers that operate on the TE principle, in order to generate a homogeneous glow discharge in a gas space of a laser chamber between laser electrodes, the excitation circuit including the laser chamber, at least two of the laser electrodes being spaced apart and opposite each other in the laser chamber and having electrode surfaces extended parallel to the optical axis of the laser chamber and preferably having a solid cross section in this direction; at least one fast acting high voltage switch to be activated or fired for generating high voltage pulses at the laser electrodes by a pulse forming network; means for preionizing the gas space of the laser chamber, before the high voltage pulse applied to the laser electrodes reaches the firing threshold of the laser glow discharge; the pulse forming network including at least a first and a second network capacitor and associated equivalent inductances of the excitation circuit, resulting in particular from the inherent inductance, the high voltage switch, laser chamber, the supply lines and the network capacitors; the at least first and second network capacitors with coatings and intermediate dielectric layers thereof being aligned essentially parallel to the optical axis of the laser chamber to form a stacked capacitor packet and being connected within the pulse forming network.

Such an excitation circuit is known from U.S. Pat. No. 4,365,337 or European Patent No. 0 0 24 576 B1, in which embodiments for the pulse forming network, in the form of LC inversion or charge transfer circuits, are discussed.

U.S. Pat. No. 4,573,160 describes an excitation circuit of that type, it furthermore discusses a pulse forming network with an inversion-charge transfer circuit (ICT circuit) and in addition to embodiments with a three dimensional configuration of the coatings of network capacitors, it also shows examples with a so-called plane configuration.

In the first-mentioned case, the stacking direction of the network capacitor coatings and the intermediate dielectric layers is parallel to the optical axis of the laser, and in the second-mentioned case, the direction of the network capacitor coatings is parallel to the optical axis of the laser with the number of coatings or partial coatings of the capacitor stack being restricted in comparison to the first-mentioned configuration, since otherwise, because of the length of the required lines, two great a level of inductance would have to be accepted. Nevertheless, such a structure is suitable for lasers with smaller power outputs.

An excitation circuit explained in the introductory paragraph is particularly important for excimer lasers. At least one fast acting high voltage switching element is needed in the excitation circuit for that type of laser, which permits a high voltage pulse to be produced at the laser electrodes by connecting a high level current. When that takes place, peaks and reverse currents that lie beyond the specifications of commercial switching elements such as thyratrons can occur if, in the case of excimer lasers, one wishes to exceed previously accessible power outputs and repetition rates. For this reason, two thyratrons which are connected in parallel have been incorporated in the laser excitation circuit in order to be able to switch high-level currents. However, when that is done, there are problems in relation to the even loading of the thyratrons.

It is accordingly an object of the invention to provide a multichannel pseudo-spark switch and an excitation circuit for gas lasers having the switch, especially for gas lasers that operate according to the TE principles and in particular for excimer lasers, which overcomes the hereinafore-mentioned disadvantages of the heretofore-known devices of this general type, and to do so in such a way that the problems set out above, which up to now have been connected with the fast-acting high voltage switch can be solved, and, in addition, to describe a configuration of a high voltage switch which can advantageously be incorporated in the excitation circuit and which is superior to known excitation circuits of this type with regard to current carrying capacity, current rise rate, and repetition rates.

With the foregoing and other objects in view there is provided, in accordance with the invention, an excitation circuit for gas lasers operating according to the TE principle, comprising a gas laser housing with a laser chamber having first and second sides defining a gas space in and an optical axis of the laser chamber, at least two laser electrodes disposed in the laser chamber for generating a homogeneous glow discharge between the laser electrodes, the laser electrodes being spaced apart and opposite each other and having electrode surfaces extended parallel to the optical axis of the laser chamber; a pulse forming network being connectable to a high voltage source at its input side and having a high anode potential and lines connected to the laser electrodes at its output side, at least one fast acting high voltage switch having lines connected to the pulse forming network at the input side thereof to be activated or fired for generating high voltage pulses at the laser electrodes with the pulse forming network; means for preionizing the gas space of the laser chamber before the high voltage pulse applied to the laser electrodes reaches a firing threshold of the laser glow discharge; the pulse forming network including at least first and second network capacitors and associated equivalent inductances of the excitation circuit resulting at least from inherent inductance of said high voltage switch, the laser chamber, the lines and of the network capacitors; the at least first and second network capacitors being connected within the pulse forming network and having first and second types of coatings with a given stacking direction and intermediate dielectric layers, said coatings and said dielectric layers being stacked according to said stacking direction substantially parallel to the optical axis of the laser chamber and parallel to one of the first sides of the laser chamber to form a stacked capacitor packet; the switch being a multi-channel pseudo-spark switch having a longitudinal axis oriented parallel to the given stacking direction and including auxiliary and trigger electrodes, a plurality of individual pseudo-spark switches being electrically connected in parallel to each other and disposed sequentially in a line parallel to the laser axis, the individual pseudo-spark switches having mutually opposite electrode chambers disposed in pairs and a pair of anode and cathode electrodes having electrode surfaces and facing each other with their electrode surfaces; the cathode electrodes of each of the individual pseudo-spark switches being connected to ground potential in the pulse forming network; the anode electrodes of each of the individual pseudo-spark switches being distributed along the axial length of the capacitor packet and being connected to the high anode potential of the pulse forming network; and a common multiple pseudo-spark chamber having a housing with a first side disposed at one of the first sides of the part of the gas laser housing containing the capacitor packet, the anode and cathode electrodes and the auxiliary and trigger electrodes being disposed within the common multiple pseudo-spark chamber; the electrode surfaces of the multi-channel pseudo-spark switch having different polarities and facing each other with a given distance therebetween, at least the distance of the electrode surfaces belonging to one of said polarities being increased in comparison to the distance of a plan parallel electrode configuration by a special a shape in that given distance.

In accordance with another feature of the invention, the laser electrode surfaces have solid cross sections in the direction of the optical axis of the laser chamber.

In accordance with a further feature of the invention, the anodes of the individual pseudo-spark switches are electrically insulated from each other and connected to the anode potential of the pulse forming network.

In accordance with an added feature of the invention, there is provided a common anode holder formed of discharge resistant insulating material, the anodes of each of the individual pseudo-spark switches being metallic anode inserts electrically insulated from each other in the anode holder.

In accordance with an additional feature of the invention, there are provided anode inserts disposed in some of the electrode chambers, the anode holder having a side facing the common multiple pseudo-spark chamber with slots formed therein between the anode inserts for enlarging the surface area of the anode holder.

In accordance with yet another feature of the invention, the multi-channel pseudo-spark switch has an anode holder having metal parts and insulating parts bordering the common multiple pseudo-spark chamber and having recesses formed therein, a main insulator fixed to the anode holder, and a shaped cathode body being common to all of the pseudo-spark switches and being elongated and approximately rectangular as seen in a plan view, the shaped cathode body having the electrode chambers comprising of bores formed therein for spark channels of the individual pseudo-spark switches, and the shaped cathode body having ends and lateral surfaces with projections corresponding to and fitting into the recesses formed in the anode holder, for interrupting a line-of-sight connection of the common multiple pseudo-spark chamber to at least one of the parts of the anode holder and the main insulator.

In accordance with yet an added feature of the invention, the electrode surfaces are anode surfaces and cathode surfaces, the multi-channel pseudo-spark switch has an anode holder bordering the anode surfaces, at least one of the electrode surfaces has a concave trough-like contour as viewed in the longitudinal direction of the common multiple pseudo-spark chamber, and the given distance between the electrodes is greatest in the vicinity of the electrode chambers.

In accordance with yet an additional feature of the invention, the electrode chambers are anode and cathode electrode chambers having wall portions being directly exposed to pseudo-sparks, and inserts disposed in at least one of the anode and cathode electrode chambers as protective linings, the inserts being a metal or metal alloy with a high melting point and a high resistance to sputtering.

In accordance with again another feature of the invention, the anode chambers have a first portion with a first unobstructed width, and a second expanded portion with a second unobstructed width being greater than the first unobstructed width, each of the second expanded portions of the anode chambers being adjacent a respective one of the first portions of the anode chambers forming a pseudo-spark partial chamber for each of the individual pseudo-spark switches.

In accordance with again a further feature of the invention, the cathode chambers have a first portion with a first unobstructed width, and a second expanded portion with a second unobstructed width being greater than the first unobstructed width, each of the second expanded portion of the cathode chambers being adjacent a respective one of the first portions of the cathode chambers forming a pseudo-spark partial chamber in the hollow cathode of each of the individual pseudo-spark switches.

In accordance with again an added feature of the invention, the at least first and second network capacitors with the coatings and the intermediate dielectric layers thereof extend substantially normal to the optical axis of the laser chamber.

The advantages that can be achieved with the present invention are mainly that the power output of the gas laser of this type, which includes the excimer laser, can be greatly increased. The demands imposed on the switching element with regard to peak current strength, current rise rate, reversal current strength and dialectic strength can therefore be satisfied under the boundary conditions of the low impedance, short time high pressure glow discharge. Characteristic for the so-called pseudo-sparks are a rapid voltage decay in 2 ns to 50 ns, a simultaneously achievable low-level jitter in the ns-range, a high current rise rate of $10^{12}$ A/S and more, and the high achievable current densities of $5 \times 10^6$ A/cm$^2$. In addition to these data, which are derived directly from pseudo-spark physics, mention must also be made of characteristics that are of extremely great technical significance. The discharge of the pseudo-sparks takes place on the axis of holes drilled in the electrodes and the accelerated positive and negative charge carriers of the discharge are distributed in large-volume spaces behind the electrodes, given a suitable structural layout of the switch. Such a discharge geometry prevents erosion and sputter processes that severely restrict the useful life of thyratrons and spark gaps under high loads. The pseudo-spark switch permits a 100% current reversal, and the polarity of this switch can be selected as desired. The low trigger energy and the large working range of the low pressure discharge are most advantageous relative to pressure (p) and distance (d). The compact structure accomplished due to the fact that there are no auxiliary electrodes and auxiliary grids that require structural and stand-off volumes in the discharge space, permits an extremely low inherent inductance for the switch element resulting from the structure, and permits comparatively high current rise times in the pulse forming network.

In accordance with again an additional feature of the invention, the multi-channel pseudo-spark switch (MUPS switch) is a separate structural element that is accommodated within a shielded housing and is connected through potential connections, e.g., in the form of high current cables with high current plug-type connections and/or the like, to the anodes and to the ground potential of an electrical high voltage pulse circuit that is to be triggered.

In accordance with a concomitant feature of the invention, the when the excitation circuit relates preferably to a so-called three dimensional configuration of or network capacitors in which the stack direction of their coatings is essentially parallel to the optical axis of the laser and in which a cooled liquid dielectric, in particular chemically pure water, is used (for which reason it is referred to as a "water capacitor"), the invention can also be used to advantage for so-called plane laser configurations in LC inversion, charge transfer, or inversion charge transfer circuits in which the network capacitors with their coatings and the intermediate dielectric layers run in planes that are essentially parallel to the optical axis of the laser and accordingly the stacking direction of the coatings is approximately normal to the optical axis.

Other features which are considered as characteristic for the invention are set forth in the appended claims.

Although the invention is illustrated and described herein as embodied in a multichannel pseudo-spark switch and an excitation circuit for gas lasers having the switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
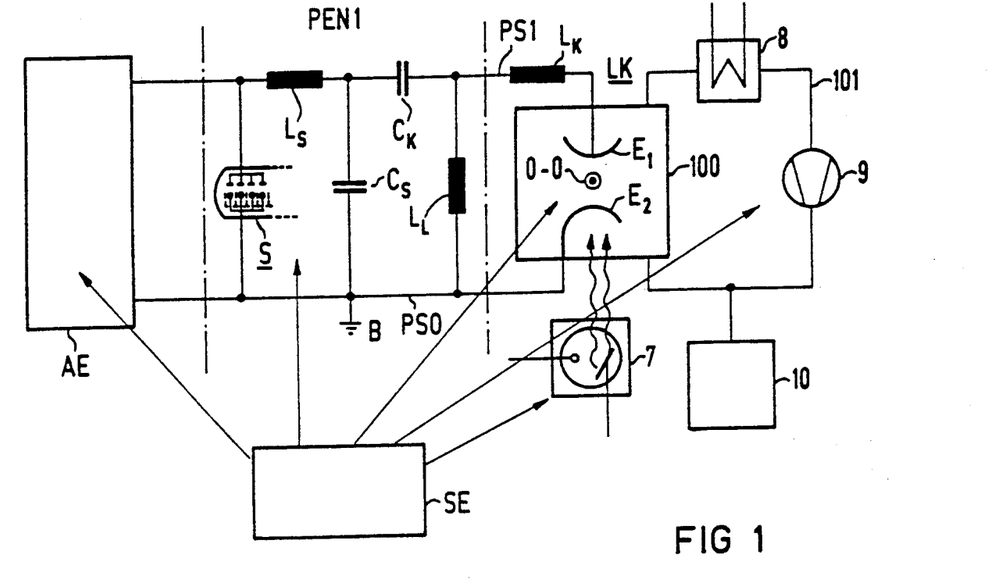
FIG. 1 is a schematic and block circuit diagram of an overall laser system, which contains an excitation circuit according to the present invention and includes a MUPS switch.

Referring now to the figures of the drawings in detail and first, particularly, to FIG. 1 thereof, there is seen an excitation circuit which includes a laser chamber LK (also referred to as a laser head) and a pulse forming network PEN 1, that is based on an LC inversion circuit, which is also referred to as a Blümlein circuit. The excitation circuit is intended for use in gas lasers that operate on the TE (Transversely Excited) principle, and serves to generate a homogeneous glow discharge in a gas space 100 of the laser chamber LK between laser electrodes $E_1$, $E_2$. Within the laser chamber LK there are at least two of the laser electrodes $E_1$, $E_2$ that are mutually separated and extend with their electrode surfaces parallel to an optical axis 0—0 of the laser chamber and preferably have a solid cross section that extends in this direction (which can be seen in greater detail in FIG. 6). Furthermore, the excitation circuit has at least one fast acting high voltage switch S, which is activated or fired by the pulse forming network PEN 1 for generating high voltage pulses at the laser electrodes $E_1$, $E_2$. The high voltage switch S is configured as a multi-channel pseudo-spark switch, which will be referred to below as a MUPS switch. The MUPS switch is formed of a plurality of individual pseudo-spark switches that are connected to each other in parallel, are triggered simultaneously, and are referred to below as P-switches. Furthermore, the system incorporates a preionization system 7, preferably as an X-ray preionization system, which serves for preionization of the gas space 100 in the laser chamber LK before the high voltage pulse that is applied to the laser electrodes $E_1$, $E_2$ reaches the triggering threshold of the glow discharge. The pulse forming network PEN 1 includes at least a first and a second network capacitor $C_s$, $C_k$ and associated equivalent inductances $L_k$, $L_s$ of the excitation circuit. The equivalent inductances result in particular from the inherent inductance of the MUPS switch S of the laser chamber LK, feed lines PS1 and PS0 and the network capacitors $C_k$ and $C_s$. These equivalent inductances had to considered when dimensioning the pulse forming network. They can also be combined with discrete inductances if the value of the equivalent inductances is not great enough. The feed line PS1 is understood to be the potential bus or its parts (feed lines that are at high voltage potential or else are connected to this potential), whereas the feed line PS0 is understood to be the ground potential bus or equivalent sections thereof. Accordingly, reference symbol B stands for the ground potential.

A charge unit AE transforms the energy supplied from the public power supply or mains to the electrotechnical demands of the pulse forming network PEN 1, which supplies power to the high pressure glow discharge in order to excite the laser gas. Once the MUPS switch S has been closed, the voltage across the electrodes $E_1$, $E_2$ of the laser chamber LK rises and the gas discharge gap breaks through, a sufficient number of charge carriers have been prepared between the laser electrodes $E_1$ and $E_2$ shortly before reaching the firing time of the X-ray preionization system 7. A rapid exchange of laser gas between the electrodes $E_1$ and $E_2$, preferably perpendicular to the optical axis 0—0 of the laser (see FIG. 6) takes place through a closed gas circuit or circulation system 101 having a cooler 8, a blower 9, and a gas metering and purifying system 10 as well as connecting gas circulation lines, when the dissipated heat that is brought about by the discharge is removed through the cooler 8. The layout of the gas circulating system 101 with its components 8 to 10 must ensure a homogeneous gas flow between the laser electrodes and a sufficient exchange rate within the volume of the gas space 100. The blower 9 maintains a throughput corresponding to the pressure loss in the gas circulation that is caused by the flow. The system 10 ensures the predetermined composition of the laser gas and removes impurities originating from operation of the laser, from the gas circulation system 101.

The overall laser system is controlled and monitored by means of sensors and adjusting elements on the individual components, through the use of an electronic control unit SE. Furthermore, the control unit SE is configured as a terminal that permits the external input of individual operating data for the laser, such as pulse energy and repetition rate, through a central computer. The control unit SE controls the charge unit AE, the pulse forming network PEN 1, the laser chamber LK, the preionization unit 7 and the gas circulating system 101, as is indicated by arrows.

Figure 2:
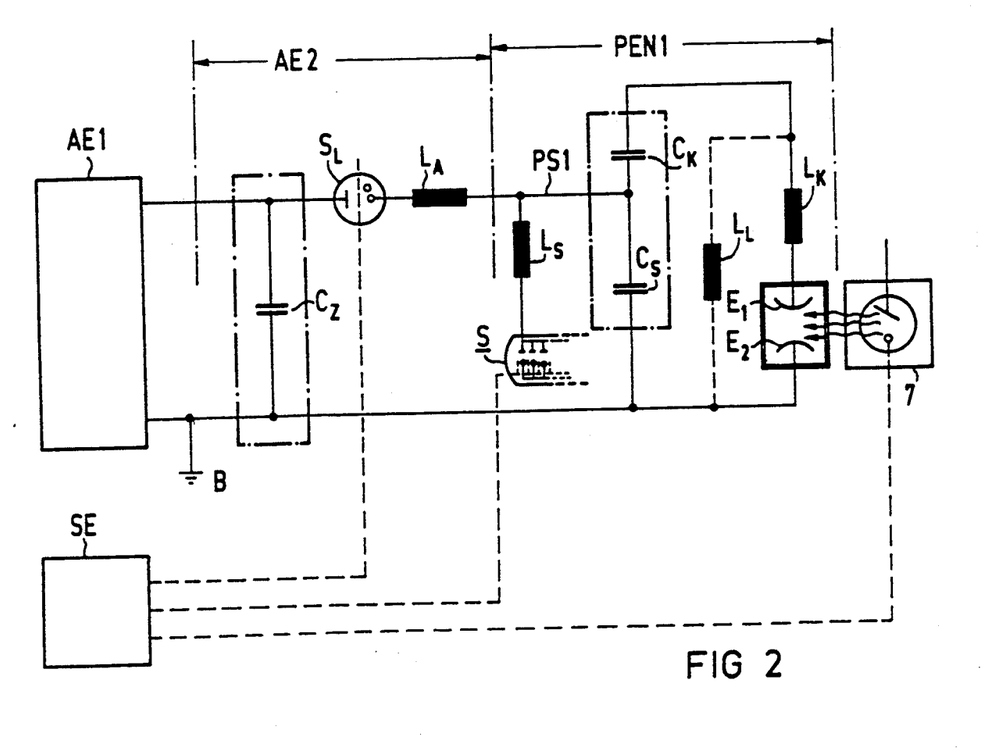
FIG. 2 is a schematic and block circuit diagram of the excitation circuit with the "pulse charge system" components, shown in somewhat greater detail.

FIG. 2 schematically shows the components of a charging apparatus AE1 and, in some detail, a pulse charge system AE2 which together form the charge unit AE shown in FIG. 1. The high voltage charging apparatus AE1 operates on a purely capacitive load to charge a capacitor $C_z$ to a nominal voltage between two discharges. An additional inductance in a long branch between the pulse charge system AE2 and the pulse forming network PEN 1 is given reference symbol $L_A$. Firing of a switch SL and the switch S is effected through the electronic control unit SE and can be precisely regulated to within nanoseconds. The electronic control unit SE emits a triggering pulse for the preionization system 7 at the correct time. The switch $S_L$ is shown as a thyratron, but it can also be in the form of a MUPS switch such as the switch S, although the pulse charge system is not an object of the present invention.

Figure 3:
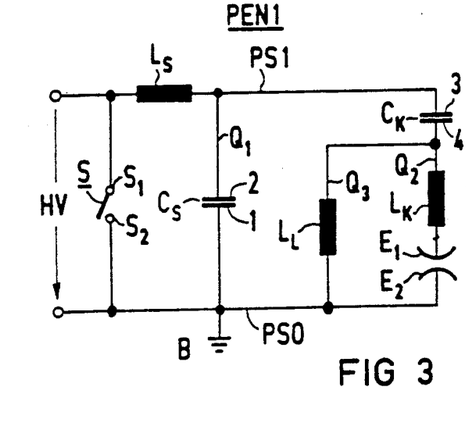
FIGS. 3 and 4 show an excitation circuit in which the pulse forming network is configured as in FIG. 1 and FIG. 2 as a LC inversion circuit, with FIG. 3 showing a circuit diagram, and FIG. 4 being a plan view of the plate package of the or network capacitors having coatings which are shown extending in the plane of the paper, showing a transposition of the circuit diagram into a diagrammatic three dimensional configuration of the network capacitors.

FIG. 3 also shows the pulse forming network PEN 1 of the excitation circuit as in FIGS. 1 and 2. In addition to the potential bus PS1 that is at high voltage potential HV (upper) and the potential bus PS0 that is at ground potential (lower), cross branches are also shown. A first cross branch containing the first network capacitor $C_s$ is given reference symbol $Q_1$, a second cross branch containing the laser chamber LK and an equivalent inductance $L_k$ that is connected in series with the laser chamber LK is given reference symbol $Q_2$, and a third cross branch $Q_3$ contains an impedance $L_L$, which has a high resistance as compared to the resistance of the laser electrode gap E1-E2 at a glow discharge, but otherwise is of such low resistance that a charging current can flow through it in order to charge the second network capacitor $C_k$, and otherwise once the glow discharge of the laser has ended, the discharge of the potential at the laser electrodes can take place, so that the excitation circuit is prepared for the next charging and recharging process in order to generate the next laser pulse. The capacitor $C_k$ is connected in the long branch, in the same way as the inductance $L_s$. The coatings of the two network capacitors are consecutively numbered 1, 2 for $C_s$ and 3, 4 for $C_k$, as shown.

Figure 4:
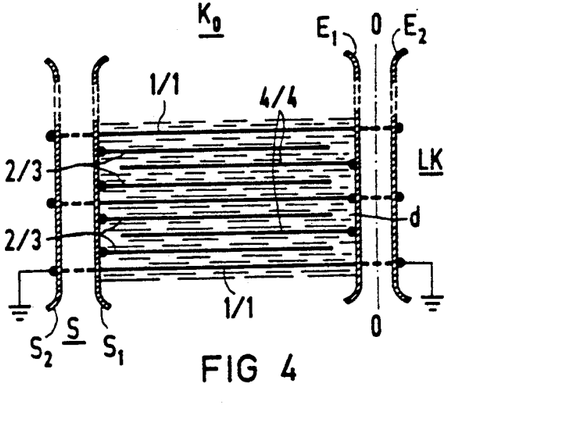

It can be seen from FIG. 4 that the first and the second network capacitors $C_s$, $C_k$ with their coatings 1 to 4, which are numbered 1/1, 4/4, ⅔ in FIG. 4 since they are partial coatings, and intervening dielectric layers d thereof, which in the present case is a liquid dielectric, in particular chemically pure water, run essentially normal to the optical axis 0—0 of the laser chamber LK or laser and essentially parallel to the optical axis of the laser chamber or laser, are stacked to form a capacitor packet, stack or package KO, and are connected within the pulse forming network PEN 1. As has been discussed, FIGS. 3 and 4 apply to or represent an LC inversion or Blülein circuit. In this circuit, as in the circuits shown in FIGS. 5 to 8 yet to be discussed, there is a first type of coating 1 and one laser electrode $E_2$ as well as a pole $S_2$ at the MUPS switch S which is at the ground or mass potential B. A second type of coating of the or network capacitors $C_s$, $C_k$, namely the coatings 2, 3, or the coatings ⅔ shown in FIG. 3, and the other pole $S_1$ of the high voltage switch or MUPS switch S, are at a high voltage potential HV or anode potential when the pulse forming network PEN 1 is charged and the MUPS switch S is open.

A characteristic of the pulse forming network PEN 1 shown in FIG. 3 (and of networks PEN 2 and PEN 3 shown in FIGS. 3 to 5), is that the potential of a third type of coating of the network capacitors, namely that of the coating 4 seen in FIG. 3 or the partial coating 4/4 seen in FIG. 4 and, in addition, the potential of the other laser electrode $E_1$, depends on three base states of the pulse forming network PEN 1:

I In the discharged state of the pulse forming network and

II In the charged state of the pulse forming network with the high voltage or MUPS switch S still open, this third type of coating (4 or 4/4) of the network capacitors as well as the other laser electrode $E_1$ are connected with ground potential via the impedance $L_L$.

III In contrast thereto, during the commutation phase that is initiated by closing the MUPS switch S, there is a commutated high voltage pulse $U_{HS}$ (t) . dt on the third type of coating 4 or 4/4, as well as on the other laser electrode $E_1$, relative to the potential of the opposing laser electrode $E_2$, which activates the laser electrode gap $E_1$–$E_2$ in order to trigger the high pressure glow discharge and which feeds this discharge with its energy.

In the above-described circuit shown in FIGS. 3 and 4, as well as in the circuits shown in FIGS. 5 to 8 to be described below, the MUPS switch S is indicated by a simplified circuit symbol, in contrast to FIGS. 1 and 2 wherein it is indicated by a circuit symbol that is similar to an electron tube. This symbol was selected because a pseudo-spark switch, whether as a single pseudo-spark switch (P-switch) or in the form of the multiple pseudo-spark switch used in this case (MUPS switch), has one or a plurality of cathode-anode gaps, with shielding caps or grids, auxiliary electrodes and trigger electrodes being associated with each cathode. All of these auxiliary functions were combined in simplified form by the representation of a grid that in each instance surrounds the cathode. The broken representation shows that the MUPS switch can be configured from a larger or smaller number of P-switches.

Figure 5:
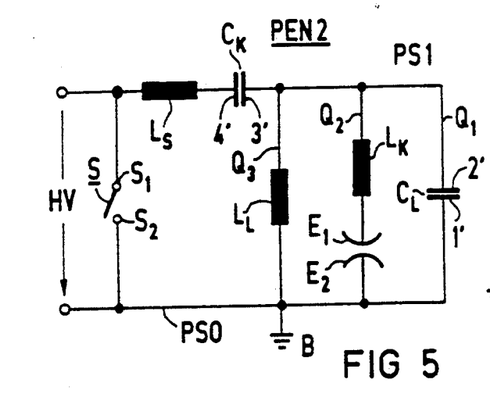
FIGS. 5 and 6 show an excitation circuit in which the pulse forming network is in the form of a charge transfer circuit, with FIG. 5 showing a circuit diagram as such, and FIG. 6 being a plan view of the plate package of the or network capacitors having coatings which are shown extending in the plane of the paper, showing the transposition of the circuit diagram as shown in FIG. 5 into a three dimensional configuration of network capacitors.
Figure 6:
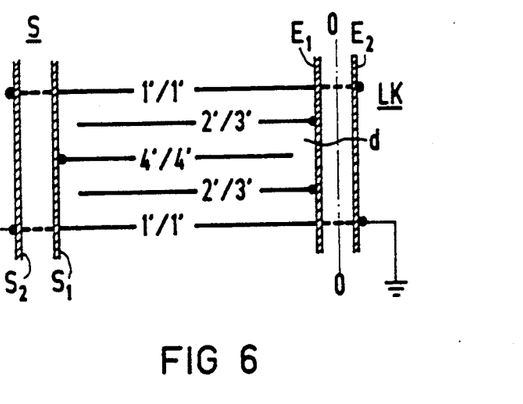

In the charge transfer switch of the pulse forming network PEN 2 shown in FIGS. 5 and 6, the coatings of the two or network capacitors $C_L$ and $C_k$ are given reference symbols 1', 2', 3', and 4'. Unlike the circuit shown in FIG. 3, the network capacitor $C_L$ that is located in the cross branch $Q_1$ is connected to one coating 3' of the network capacitor $C_k$ located in the long branch PS1, which is remote or faces away from the high voltage or MUPS switch S. A comparison of FIGS. 5 and 6 makes it plain that the partial coatings 1'/1' correspond to the coating 1', the partial coatings 2'/3' represent a combination of the coatings 2' and 3', and the partial coating 4'/4' corresponds to the coating 4'. The first type of coatings, the one laser electrode and one pole of the MUPS switch S, which are at ground potential B, are 1' or 1'/1', $E_2$ and $S_2$. The second type of coating of the network capacitors and the other pole of the MUPS switch, are at a high potential HV when the pulse forming network PEN 2 is charged and the switch S is open are 4' or 4'/4' and $S_1$. The third type of coating of the network capacitors and the other laser electrode, in which one must distinguish between the three base states I, II, and III, are 2', 3' or 2'/3', and $E_1$.

Figure 7:
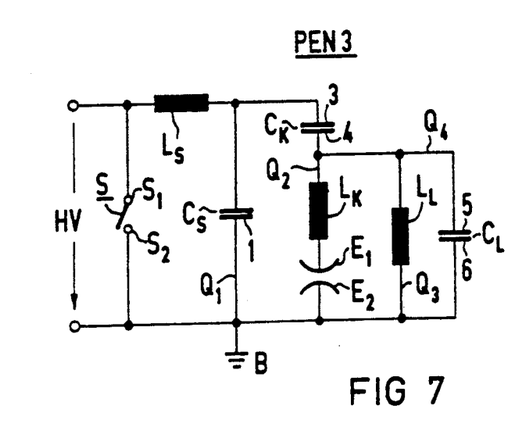
FIGS. 7 and 8 show an excitation circuit with a pulse forming network which is based on an ICT circuit (with ICT circuit standing for an inversion charge transfer circuit), with FIG. 7 being the circuit diagram as such, and FIG. 8 being a plan view of the plate package of the or network capacitors having coatings which are shown extending in the plane of the paper, showing the transposition of the circuit diagram of FIG. 7 into a three dimensional configuration of network capacitors.
Figure 8:
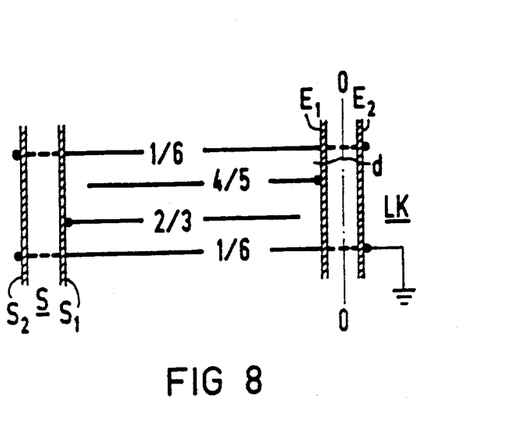

In the third embodiment of the excitation circuit with the associated pulse forming network PEN 3 as shown in FIGS. 7 and 8, what is involved is an inversion charge transfer circuit (ICT circuit). This is described in greater detail in U.S. Pat. No. 4,573,160. For this reason, this circuit will only be described to the point that is necessary to understand the present invention. One can regard this circuit as an supplemented LC inversion circuit as in FIG. 3, and for this reason the same circuit elements and the same coatings are given reference symbols in the same way. Additionally shown is a fourth cross or transverse branch Q4 with the or network capacitor $C_L$. The transposition into the spatial configuration from FIG. 7 to FIG. 8, shows that a coating combination 1–6 corresponds to partial coatings 1/6, the coating combination 2–3 corresponds to the partial coatings ⅔, and the coating combination 4–5 corresponds to the partial coatings 4/5. Once again, the coatings 1 and 6 (or the partial coatings 1/6), the laser electrode $E_2$, as well as the pole $S_2$ of the MUPS switch S (first type of coatings or electrodes) are at ground potential. The second type of coatings or electrodes, which are also at high voltage potential HV when the pulse forming network PEN 3 is charged and the MUPS switch is open, are the coatings 2 and 3 or the partial coatings ⅔, and the pole $S_1$ of the MUPS switch. The third type of coating and the other laser electrodes having a potential which depends on the three base states of the pulse forming network (PEN 3) are the coatings 4 and 5 (or the partial coatings 4/5) and the laser electrode $E_1$.

Figure 9:
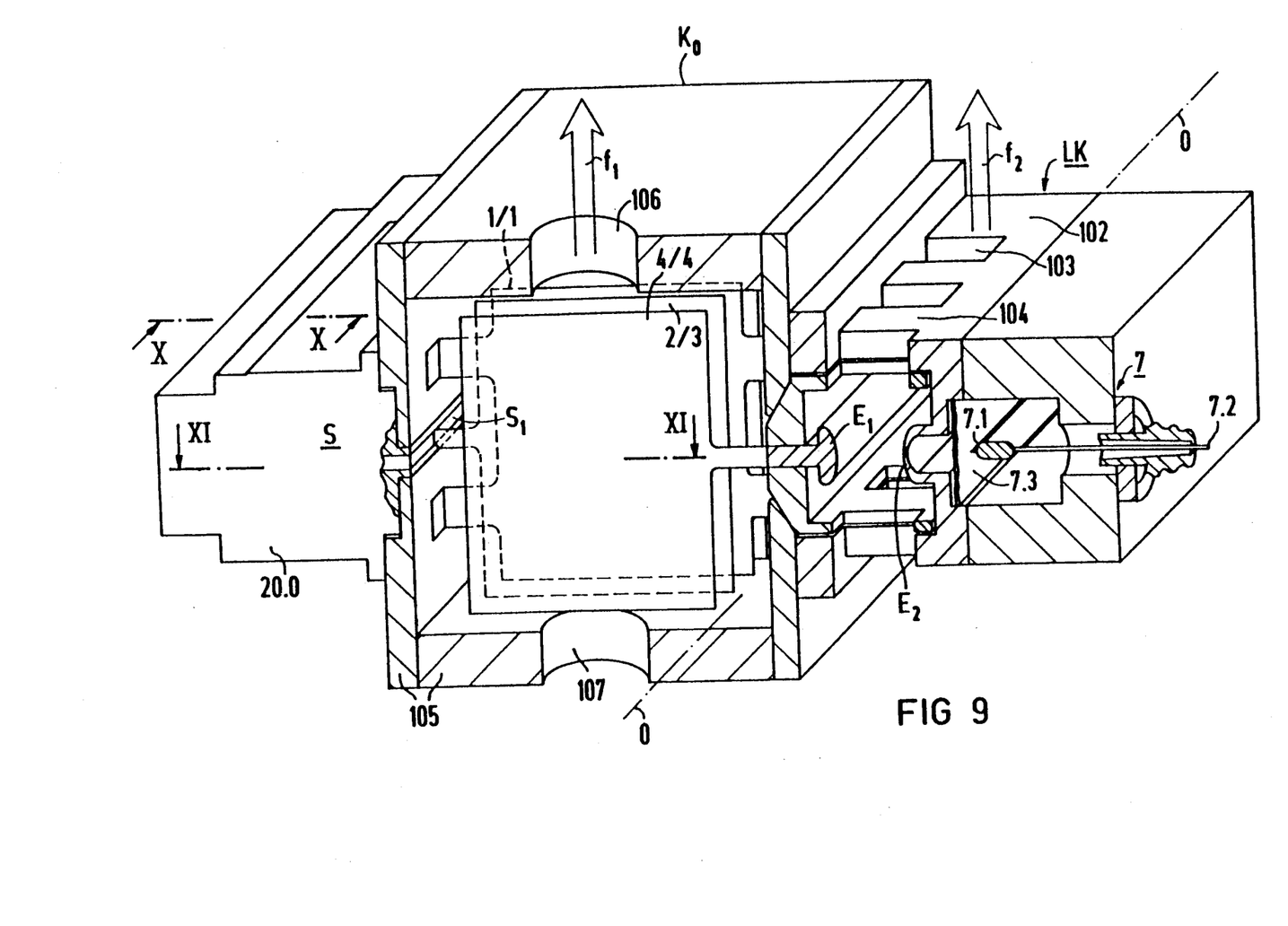
FIG. 9 is a diagrammatic, partly sectional and partly broken-away perspective view of a three dimensional configuration of network capacitors in the embodiment of a so-called water capacitor (containing chemically pure water as a dielectric and capacitor coatings as rigid metal plates that are spaced apart), with a high voltage switch unit on one long side and with the laser chamber, these being structurally combined with a preionization system on the other long side.

The center part of the laser system shown in FIG. 9 can contain one of the three three-dimensional network capacitor configurations as shown in FIGS. 4, 6, or 8. On closer examination one can see that in this case the partial coatings 4/4, ⅔, and 1/1, which follow each other in sequence in the direction of the laser axis 0—0, belong to a pulse forming network PEN 1 in the LC inversion circuit of FIG. 3.

In particular, a wall 102 of the laser chamber LK has openings 103 formed therein which are optimized from the point of view of flow technology and which permit a homogeneous, rapid exchange of gas between the electrodes $E_1$, $E_2$ at the lowest possible pressure drop in the laser chamber LK. Within webs or cross pieces 104 between the openings 103 are current returns from the electrode $E_2$ (which in this case is transparent for X-ray light) to the pulse forming network, and additional non-illustrated potential screens in the cross pieces 104, which prevent the formation of surface discharges which start from the massive or solid counter-electrode $E_1$ to the walls 102 of the housing of the laser chamber LK. The three dimensional network capacitor packet, stack or package $K_O$, in this case with its partial coatings 4/4, is connected directly to the electrode $E_1$. The partial coatings 4/4, ⅔, 1/1 (only three of which can be seen, although there can be a number of these partial coatings disposed sequentially and parallel to the laser axis 0—0) are solid or massive plates of corrosion resistant steel. A liquid dielectric, preferably chemically pure water, is used as the dielectric d (which has been omitted in FIGS. 6 and 8 for purposes of simplicity) for which reason this is referred to as a "water capacitor." The partial coatings ⅔, which carry the anode potential, are connected through suitable connector tabs with the anode pole $S_1$ of the MUPS switch S, having the cathode thereof at the ground potential B to which the metallic rectangular housing is also connected through walls 105 thereof. The pulse forming network that is integrated into the water capacitor packet $K_O$ supplies a large number of partial capacitors that are connected in parallel with water as a dielectric. Water is suitable as a self-healing dielectric due to its high dielectric constant which is equal to 80 and its high flashover field strength of more than 100 kV/cm, predominantly for the construction of low inductance pulse forming networks with a great capability for storing energy. The partial capacitors of the pulse forming network represent a large number of inductively decoupled plate capacitors with bifilar current paths.

As can be seen, the MUPS switch S is disposed on the long side of the water capacitor packet $K_O$ that is opposite the laser chamber LK. The water, which is delivered into the circulation system through a non-illustrated water preparation section, is removed from suitable removal ports 106 as seen by an arrow $f_1$, is returned through suitable openings 107 in the bottom wall and is then resupplied when prepared and cooled. The flow to or through the laser chamber LK is transverse, as seen by a directional arrow $f_2$ for the gas flow. The preionization system 7 is preferably an X-ray preionization system as seen by FIGS. 1 and 2, even though other preionization systems are basically suitable. As an example, FIG. 9 shows an elongated X-ray preionization system 7 that is installed on the outer long side of the laser chamber LK, with an elongated X-ray tube that has a razor-sharp cold cathode 7.1 to which short high voltage pulses of negative polarity are applied through insulated feeds 7.2. An anode 7.3 that is coated with heavy metal, e.g., gold, is in the form of a transmission anode and is at ground potential. The X-ray radiation that is emitted when the electrons strike the transmission anode 7.3 passes through this and the laser electrode $E_2$ that is transparent for X-ray light. The cold knife-edge of the cathode 7.1 is preferably formed of tantalum.

Figure 10:
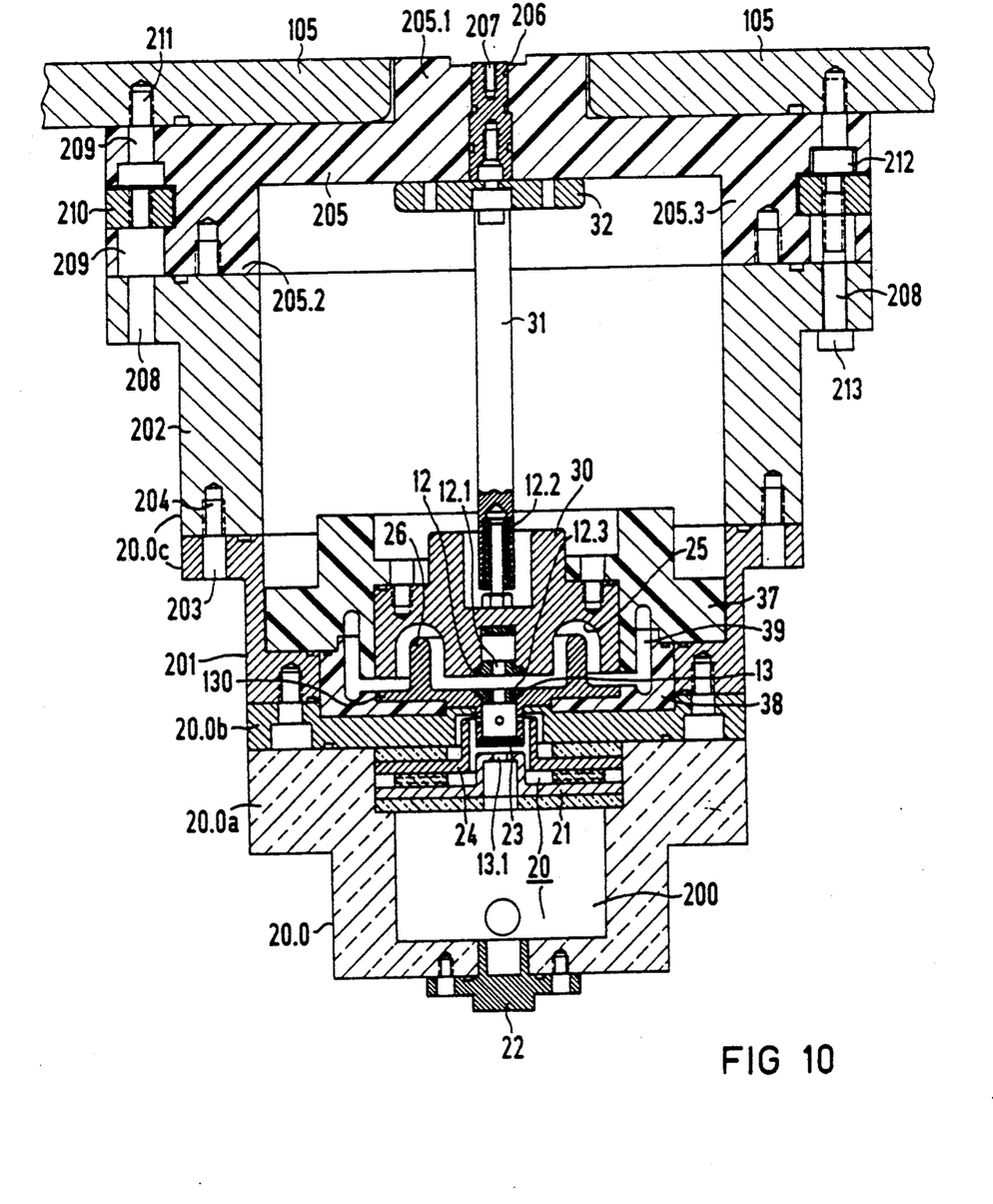
FIG. 10 is a fragmentary, cross-sectional view of the high voltage switching unit taken along the line X—X in FIG. 9, in the direction of the arrows, in which a single pseudo-spark switch (P-switch) of the MUPS switch configuration can be seen in more detail.
Figure 11:
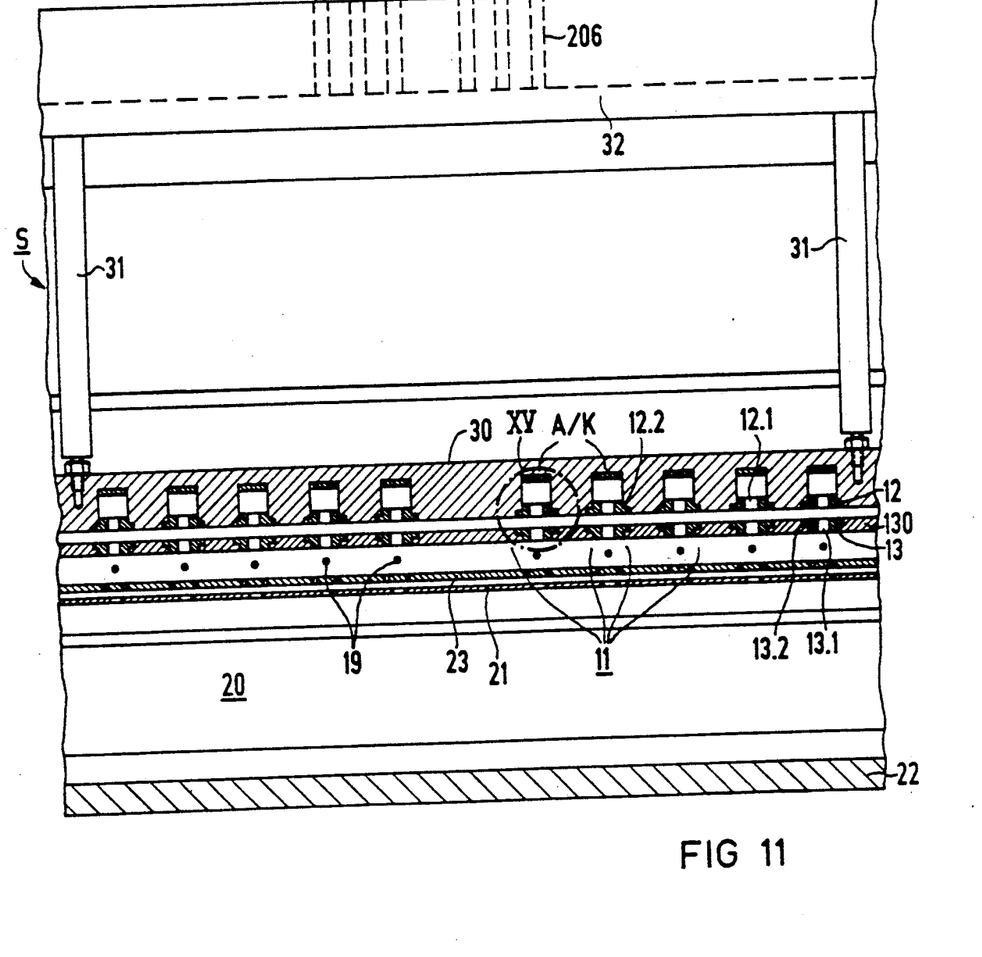
FIG. 11 is a fragmentary, partly longitudinal-sectional view of the high voltage switch unit and the adjacent water capacitor as in FIG. 6, being taken along the line XI—XI in FIG. 9, in the direction of the arrows, with FIGS. 11 and FIG. 10 showing a first embodiment of the MUPS switch in which the anode-side electrodes of the single pseudo-spark switches are connected together through a common potential bus.

FIGS. 10 and 11 show a first embodiment of the MUPS switch S. It can be seen from FIG. 11 that pairs of electrodes A/K, in each instance being formed of an anode 12 and a cathode 13 with electrode chambers in the form of bores or drillings 12.1, 13.1, that lie opposite each other in pairs, belong to a plurality of individual pseudo-spark switches (P-switches) 11 seen in FIG. 11, that are electrically connected in parallel. These P-switches 11 of the MUPS switch S (10 P-switches are shown in FIG. 11, although 15, 20, or more of them can be used) lie in spatial alignment parallel to the optical axis 0—0 of the laser or parallel to the laser axis as seen in FIG. 9, so that the longitudinal axis of the MUPS switch S is also parallel to the stacking direction of the coatings or partial coatings 4/4, ⅔, and 1/1 of the network capacitors or the water capacitor packet $K_O$. The cathodes 13 are connected to the ground potential of the pulse forming network, i.e., to the metallic housing 105 of the water capacitor packet $K_O$. The anodes 12 of each P-switch 11 are distributed along the axial length of the capacitor packet or water capacitor $K_O$ at the second type of coatings of the or network capacitors and thus connected at the high anode potential HV of the pulse forming network. In addition, as is shown by FIG. 11 in conjunction with FIG. 10, the electrodes of the anode and cathode 12 and 13, including so-called cathode caps 23, of a first auxiliary electrode 24 seen in FIG. 10, a second auxiliary electrode 21 and a trigger electrode 22 are accommodated within a common multiple pseudo-spark or MUPS chamber 20. FIGS. 9 and 10 show that a housing 20.0 of the MUPS chamber 20 is attached at a long side to a corresponding long side of the part of the housing wall 105 of the gas laser that contains the capacitor packet $K_O$. A trigger space 200 forms a partial volume of the MUPS chamber 20 that belongs to the trigger electrode 22.

The housing 20.0 of the MUPS chamber 20 is formed by a part of a U-shaped cross section of high voltage resistant insulating material 20.0a, a plate-like metal part 20.0b, and a side part 20.0c that is of Z-shaped cross section providing a current return to the cathode. This metallic, Z-shaped side part 20.0c that extends on both longitudinal sides of the housing 20.0 is formed of two wall sections 201 with a Z-shaped cross section and two wall sections 202 with an L-shaped cross-section that are bolted to each other so as to provide contact over a large area. Although the bolts are not indicated in FIG. 10, associated bores or drillings 203 and associated blind holes or drillings 204 which have an internal thread are shown.

The L-shaped wall sections 202 are bolted in such a way that their flanges are secured to and form a seal on a switch insulating plate 205. The cross section of the switch insulating plate 205 is in the shape of an inverted U with a central extension piece 205.1 on the side thereof that is remote from U-arms 205.2, 205.3 thereof. This extension piece 205.1 forms an insulating and sealing lead-through for a bolt-like current carrying part 206 that is at anode potential. One end of the part 206 is secured to an anode potential bus 32 in such a way as to form a contact and the other end of the part 206, which is proximate to the water capacitor, is screwed to the plates or partial coatings ⅔ of the water capacitor that bear the anode potential, such as by means of contact tabs or contact screws 207. The mechanical and sealing connection between the wall section 202 and the wall 105 of the water capacitor packet $K_O$ is effected by means of suitable lead-throughs 208 in the wall section 202, lead-throughs 209 in the flanges or arms 205.2, 205.3, metallic rails 210 being imbedded in the arms 205.2, 205.3 and provided with threaded holes, threaded blind holes 211 in the metallic wall 105 and suitable connecting bolts 212, 213. The rails 210 are reinforcing rails for the switch insulating plate 205, as is shown in the right-hand portion of FIG. 10, where the flange of the wall section 202 is drawn tight against the counter flange 205.3 by means of the threaded bolts that are anchored in the rails 211. The bolts 212 (shown in the right-hand portion of FIG. 10) are inserted into the lead-throughs or drillings 209 and the threaded blind holes 211 in order to tighten the switch insulating plate 205 and to seal it against the wall 105. The current carrying and potential connection of the wall sections 202 and 201 to the wall 105 is effected by means of wide flexible current strips of copper braid, into which the current measurement shunt can also be incorporated, and which are connected by means of current connecting bolts that are screwed into the threaded blind holes or drillings 204 and into the rails 210 in a non-illustrated manner. These current bands are screwed to the metal wall 105 of the water non-illustrated capacitor so as to provide a contact.

In FIG. 10, an anode holder insulation configured as a shaped body is given reference numeral 37 and an additional insulating body that supports the cathode-support body 130 is given reference numeral 38. This defines a partial chamber 39 of the MUPS chamber 20 together with an anode holder 30 and the anode holder insulation 37, as seen in FIG. 10.

In the embodiment shown in FIGS. 10 and 11, all of the anodes are connected to each other metallically and they are accommodated in a metallic anode holder 30 which is connected to the potential bus 3 of the pulse forming network through potential connecting bolts 31. In the case of the LC inversion circuit being used as a pulse forming network, this involves the partial coatings ⅔ of the capacitor packet $K_O$ (which is only shown in section in FIG. 11) that are metallically conductively connected with the anode potential bus 32 and the current bearing parts 206. In the embodiment shown in FIGS. 10 and 11, the potential connecting bolts 31 also serve to produce a defined inductance, so that the MUPS switch S, which is of very low inductance, can be matched to the requirements of such a pulse forming circuit, which requires a higher inductance of the high voltage switch. If one uses pulse forming networks where this is not necessary, the longer potential connecting bolts 31 shown in FIGS. 10 and 11 can be eliminated and the entire MUPS switch can be built considerably shorter, as viewed transversely to the direction of the laser axis 0—0. The drawing of FIG. 10 can also be used to explain the second embodiment of the MUPS switch shown in FIGS. 12 to 14. If one disregards the long potential connecting bolts 31, it is seen that the MUPS switch with the pulse forming network PEN 1 is integrated to a greater extent, i.e., the individual anodes 12 are combined with essentially shorter current connecting bolts seen in FIG. 12 or at least are combined to form an easily assembled anode-connecting bolt unit 12.2-33 seen in FIG. 14.

Figure 12:
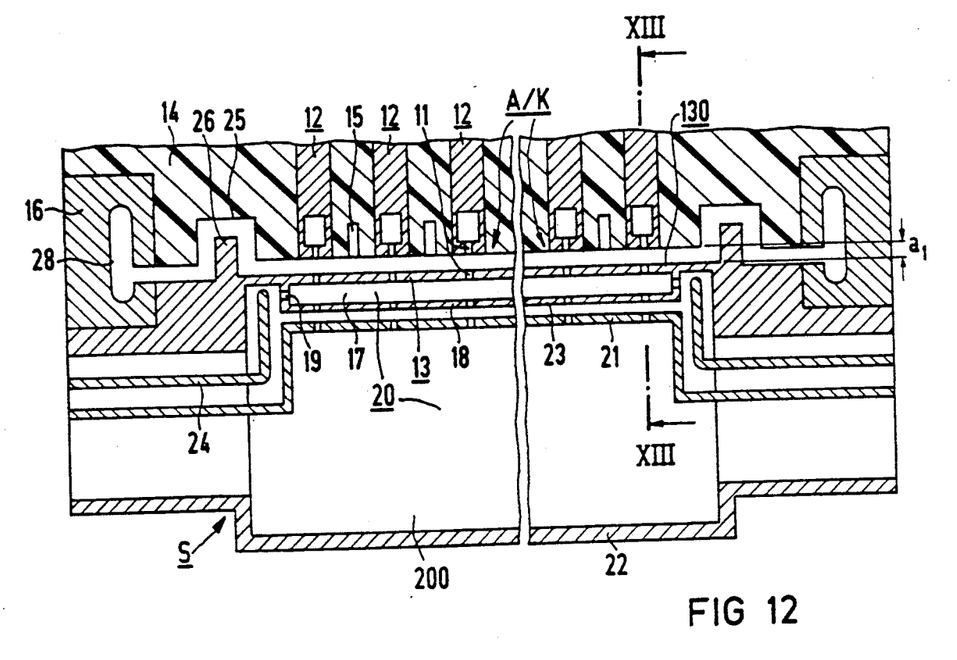
FIG. 12 is a somewhat modified view as compared to FIG. 11, with the remainder also being a partial longitudinal section of a second embodiment of the MUPS switch configuration in which the individual switch anodes are electrically separated from each other.

The MUPS switch S in FIG. 12 also has a parallel circuit of a plurality of individual pseudo-spark switches 11, the anode 12 of each P switch 11 being insulated from all of the other anodes 12 and being separately triggered. In contrast to this, the cathode 13 is common to all of the pairs of electrodes A/K and all of the P-switch channels. The separate metallic anodes 12 are in a common insulating body, which is an anode holder 14. Slits 15 are formed in the anode holder 14 between the metallic anode inserts 12. The anode holder 14 is separated from the cathode 13 by means of an insulating body which is a main insulator 16, and it is held at a distance $a_1$ from the cathode 13 by the main insulator 16. The MUPS switch S is filled with an ionizable low pressure gas charge at pressure p. A voltage is applied to the anode 12 and the cathode 13 so that the resulting gas discharge is located on the left-hand branch of the Paschen curve.

The MUPS switch S is provided with a cathode rear space 17 that is common to all of the P-switches 11, stretches across all of these P-switches and is formed by the cathode cap 23 which is made of metal. The cap 23 has first openings 18 and second openings 19 formed therein, which make it possible to trigger the main discharge. A DC predischarge burns as a preionization of the trigger space 200 (also seen in FIG. 10) between the second auxiliary electrode 21 and the trigger electrode 22, that extend in the longitudinal direction across all of the discharge channels. Firing is initiated by means of a switch pulse that initiates a trigger discharge from the trigger electrode 22 to the cathode cap 23 through the second auxiliary electrode 21. A blocking potential is applied to the first auxiliary electrode 24, which also extends across all of the P-switches 11. A shaped body 130 for the individual cathodes 13, which is common to all of the P-switches 11 and is elongated and approximately rectangular as seen in a plan view, is provided with electrode bores or drillings for the spark channels of the individual P-switches 11. These electrode bores or drillings are provided with the individual inserts for the cathodes 13 (see FIGS. 10 and 11) or they form the spark channels themselves if the cathode shaped body itself is of a sufficiently spark and plasma resistant metal alloy. The ends of the shaped body 130 seen in FIG. 12 as well as the sides of the shaped body 130 seen in FIG. 10, are provided with projections 26 with which it fits in a corresponding offset or recess 25 in the anode holder 14, so that a line-of-sight connection of the MUPS chamber 20 to the adjacent insulating material parts of the anode holder 44 and of the main insulator 16 that fixes the anode holder 14, is interrupted in the longitudinal and transverse direction.

Figure 13:
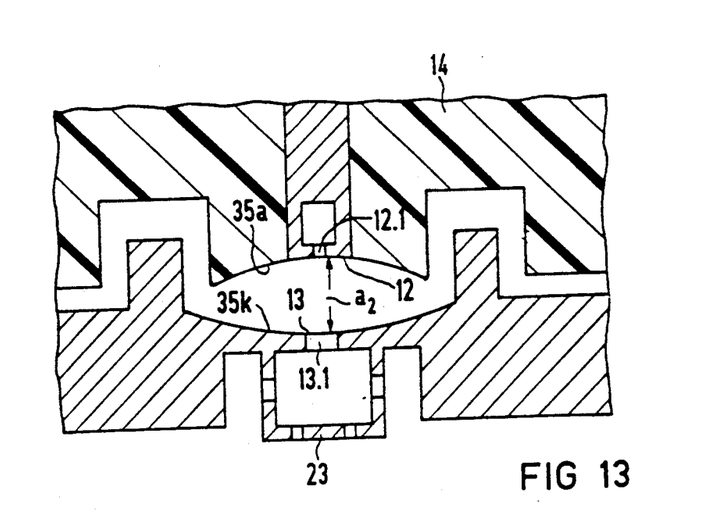
FIG. 13 is fragmentary, cross-sectional view of a modified embodiment of the electrode configuration taken along the line XIII—XIII in FIG. 12, in the direction of the arrows, with an electrode interval that increases toward the center of the opposing electrodes of the individual pseudo-spark switch in each instance.

The section of FIG. 13 shows that of the surfaces of the cathode 13 and of the anode 12 of the particular P-switch 11 or of the total MUPS sWitch S which face each other, at least the distance of the electrode surfaces belongs to one polarity has been increased in comparison to the distance or gap between the electrode surface of a plan parallel electrode configuration A/K, by a special shaping of the distance $a_2$ thereof to the opposite electrode surfaces of the other polarity. Preferably, to this end, the surfaces of the anode 12 and of the adjacent anode holder sections and/or the opposite surfaces of the cathode 13, as viewed in the longitudinal direction of the MUPS chamber 20, have concave trough-like contours 35a of the anode and 35k of the cathode, with the greatest electrode interval resulting in the area of the respective electrode bores or drillings 12.1 and 13.1. As one can see from FIG. 10 and FIG. 11, as well as FIG. 14, which is still to be discussed, the wall sections of the electrode bores or drillings 12.1, 13.1 that are exposed directly to the pseudo-sparks are covered with a protective lining in the form of anode or cathode inserts 12.2, 13.2, being formed of a metal or a metal alloy with a high melting point and a high resistance to sputtering.

Figure 14:
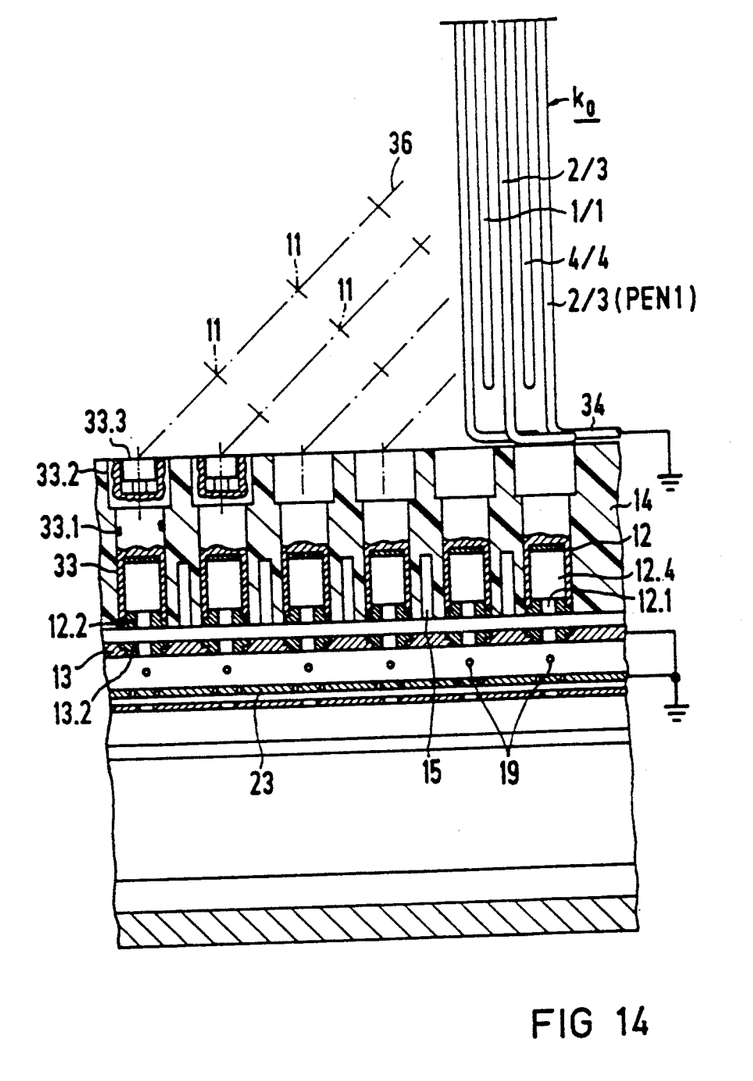
FIG. 14 is a fragmentary, longitudinal-sectional view corresponding to FIG. 12, showing a more detailed representation of an embodiment shown in FIG. 12.
Figure 15:
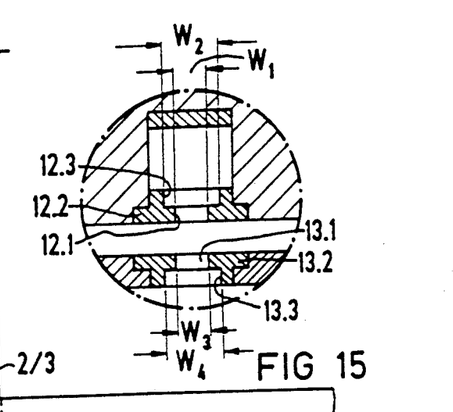
FIG. 15 is an enlarged view of the portion XV of FIG. 11.

Furthermore, as is shown in the portion XV in FIG. 15, a preferred embodiment is constructed in such a way that in each of the anode inserts 12.2, an expanded anode bore or drilling 12.3 of increased unobstructed width $W_2$ is formed adjacent the anode bore or drilling 12.1 having a first unobstructed width $W_1$, which forms a pseudo-spark partial chamber or anode chamber with a first portion 12.1 and a second (expanded) portion 12.3 for each P-switch 11. This version applies preferably to the drawings of FIGS. 10 to 14, although it is not recognizable therein. Due to this configuration, there is a reduced anode lost power dissipation and a more rapid reduction of circuit resistance upon "closing the switch." The cathode inserts are preferably identically configured forming cathode chambers, as indicated by an expanded cathode bore or drilling 13.3 and a resulting increased unobstructed width $W_4$ which is greater than an unobstructed width $W_3$ that belongs to the electrode bore 13.1 and equals the width $W_1$. Thereby first and second 13.1, 13.3 of the cathode chambers from a pseudo-spark partial chamber in the hollow cathode of each of the individual pseudo-spark switches.

The end of the cathode cap 23 seen in FIG. 12 in the direction of the trigger space 20 can be formed of a perforated plate or a metal grid. The second auxiliary electrode 21 has either a slot that extends across all of the P-switches 11 or individual holes 19, with the slots or individual holes lying on the axes of the electrode pairs A/K.

In contrast to FIG. 12, FIG. 14 shows a detailed representation of the configuration of the individual anodes. The special connecting bolts 33 are inserted into the anode holder 14 so as to be sealed by an 0-ring 33.1, that is shown at the first bolt in the series of bolts. The insert bodies 12.2, which have the anode bores or drillings 12.1, are screwed in these bolts, which are each hollow at their ends so that they define partial spark chambers 12.4. Heads 33.2 of the special bolts 33 are constructed as hexagon socket bolts with an inside socket 33.3. The coatings of the capacitor packets $K_O$ that carry the anode potential are connected to the heads 33.2 in such a way as to be electrically conductive. As an example, the recesses 33.3 for the internal hexagon socket could also have an interior thread, and a contact head screw could be screwed into the interior thread and pass through an eyelet in a bend 34 at the end of the coating ⅜ (if an LC inversion circuit as in FIG. 3 is being used). The designation of the network capacitor coating in FIG. 14 would be analogously different were a pulse forming network PEN 2 as in FIG. 5 or a pulse forming network PEN 3 as in FIG. 3 to be used as a basis.

The embodiment shown in FIG. 15 can also be selected for the configuration of the anode and cathode inserts 12.2, 13.2, although this is not shown in FIG. 14 for reasons of greater clarity.

The advantages which result from the individual anode configuration as in FIGS. 12 to 14, with consideration of FIG. 10, are in particular, as follows:

Decoupling of the switch channels, for example, is possible in order to switch discharge stages independently of each other. Due to the common triggering it is nevertheless possible to do this at a high level of precision with regard to timing.

The current distribution over the channels of the MUPS switch S is predetermined by separate discharge stages and cannot vary statistically, which leads to an increased service life.

The individual anode configuration according to the present invention reduces the demands placed on triggering precision. Therefore, further measures for increasing service life, which would at the same time have negative effect on triggering precision, can be adopted in this switch and trigger section.

The function of an individual pseudo-spark switch is described in principle in German Patent DE-PS 28 04 393 C2, corresponding to U.S. Pat. No. 4,335,465. Further developments of such a pseudo-spark switch are described in a publication by G. Mechtersheimer, R. Kohler, T. Lasser, and R. Meyer in J. Phys. E 19 (1986) pp. 466 to 470, in a further paper by J. Mechtersheimer and R. Kohler in J. Phys. E 20 (1987), pp. 270 to 273, and finally in a conference paper by E. Boggasch, H. Riege and V. Brückner, at the Proceedings of the 5th IEEE Pulsed Power Conference in Arlington, June 1985, pp. 820 to 823.

The greatest distance $a_2$ between the anode 12 and the cathode 13 of the MUPS switch and thus the fact that the location of the least dielectric strength lies in the area of the electrode bores or drillings 12.1, 13.1, is ensured by the measures shown in FIG. 13, namely that the anode surfaces and the adjacent anode holder sections 35a and/or the opposite cathode surfaces 35k of the MUPS switch S, as viewed in the longitudinal direction of the MUPS chamber 20, have a concave trough-like contour, with the greatest interval between the electrodes $a_2$ resulting in the area of the electrode bores or drillings 12.1, 13.1. Any incorrect discharges that could take place there will cause no damage. The special form of the bores or drillings in the anode 12 and the cathode 13 described on the basis of FIG. 15 serves to reduce the performance loss in the switch. Experience has shown that the area around the electrode bores or drillings 12.1, 13.1 on the facing sides of the anode 12 and the cathode 13 is the area of the greatest damage to the electrodes in pseudo-spark switches.

Therefore, the wall sections of the electrode bores or drillings that are directly exposed to the pseudo-sparks have anode and/or cathode inserts as protective linings, which are formed of a metal or a metal alloy with a high melting point and high resistance to sputtering. A special discharge material, e.g., a tungsten alloy, is to be used at those points.

Phantom lines 36 with intersection points 11 shown diagrammatically and in perspective in FIG. 14, indicate the position of P-switches, if a plurality of lines 11-11-11, etc., are used to form a P-switch, instead of only one line of P-switches.

It is noted that in the case of the so-called ICT circuit according to FIG. 7 and its transposition into a three-dimensional capacitor configuration according to FIG. 8, the inherent and connecting inductivities of the series circuit of the capacitors $C_1$ and $C_2$, on one hand, and those inductivities of the third network capacitor $C_3$ connected in parallel thereto, on the other hand, are small, preferably approximately one order of magnitude smaller, than the equivalent inductivity $L_k$ in the branch of the laser electrodes $E_1$ and $E_2$. The advantage of the illustrated exemplary embodiment of the network capacitors as so-called capacitors, as they are described, for example, in U.S. Pat. No. 4,573,160 (in so-called planar and so-called three-dimensional configurations), lies especially in the decidedly lower inherent inductivity. In other words, the equivalent inductivity of the network capacitors is relatively very small in comparison to the equivalent inductivities of the lines and the remaining circuit elements (laser, high-voltage switch, etc.). The above-described network capacitors $C_S$, $C_k$, $C_L$, etc. constructed as so-called capacitors, differ from a so-called transmission line. For the latter it is characteristic that it has a capacitance and inductivity coating which is distributed over its length as evenly as possible. In the construction as capacitors, the coatings run transverse to the optical axis of the laser which is structurally united therewith, and they are electrically connected with the continuous TE-laser electrodes. Such a capacitor configuration does not constitute a transmission line, since the inductivity of the pulse forming network is practically concentrated in the laser head and the capacitor configuration has a practically negligible inductivity coating, as mentioned above. The capacitance must be localized exactly, i.e. to the individual network capacitor units, which are repeated regularly. The dielectric is preferably a liquid (chemically pure water, for example, resulting in the term water capacitor), but solid materials, such as ceramics, are also suitable as dielectrics.

We claim:

1. An excitation circuit for gas lasers operating according to the TE principle, comprising:

A) a gas laser housing with a laser chamber having first and second sides and defining a gas space in and an optical axis of said laser chamber, at least two laser electrodes disposed in said laser chamber for generating a homogeneous glow discharge between said laser electrodes, said laser electrodes being spaced apart and opposite each other and having electrode surfaces extended parallel to the optical axis of said laser chamber;

B) a pulse forming network being connectable to a high voltage source at its input side and having a high anode potential and lines connected to said laser electrodes at its output side, at least one fast acting high voltage switch having lines connected to said pulse forming network at the input side thereof to be activated or fired for generating high voltage pulses at said laser electrodes with said pulse forming network;

C) means for preionizing the gas space of said laser chamber before the high voltage pulse applied to said laser electrodes reaches a firing threshold of the laser glow discharge;

D) said pulse forming network including at least first and second network capacitors and associated equivalent inductances of the excitation circuit resulting at least from inherent inductance of said high voltage switch, said laser chamber, said lines and of said network capacitors;

E) said at least first and second network capacitors being connected within said pulse forming network and having first and second types of coatings with a given stacking direction and intermediate dielectric layers, said coatings and said dielectric layers being stacked according to said stacking direction substantially parallel to the optical axis of said laser chamber to form a stacked capacitor packet and parallel to one of the first sides of the laser chamber;

said switch being a multi-channel pseudo-spark switch having a longitudinal axis oriented parallel to said given stacking direction and including:

a) auxiliary and trigger electrodes, a plurality of individual pseudo-spark switches being electrically connected in parallel to each other and disposed sequentially in a line parallel to the laser axis, said individual pseudo-spark switches having mutually opposite electrode chambers disposed in pairs and a pair of anode and cathode electrodes having electrode surfaces and facing their electrode surfaces;

b) said cathode electrodes of each of said individual pseudo-spark switches being connected to ground potential in said pulse forming network;

c) said anode electrodes of each of said individual pseudo-spark switches being distributed along the axial length of said capacitor packet and being connected to the high anode potential of said pulse forming network; and d) a common multiple pseudo-spark chamber having a housing with a first side disposed at one of the first sides of said part of said gas laser housing containing said capacitor packet, said anode and cathode electrodes and said auxiliary and trigger electrodes being disposed within said common multiple pseudo-spark chamber;

e) said electrode surfaces of said multi-channel pseudo-spark switch have different polarities and face each other with a given distance therebetween, at least the distance of said electrode surfaces belonging to one of said polarities being increased in comparison to the distance of a plane parallel electrode configuration by a special shape in said given distance.

2. An excitation circuit according to claim 1, wherein said electrode surfaces have solid cross sections in the direction of the optical axis of said laser chamber.

3. An excitation circuit according to claim 1, wherein said anodes of said individual pseudo-spark switches are electrically insulated from each other and connected to the anode potential of said pulse forming network.

4. An excitation circuit according to claim 3, including a common anode holder formed of discharge resistant insulating material, said anodes of each of said individual pseudo-spark switches being metallic anode inserts electrically insulated from each other in said anode holder.

5. An excitation circuit according to claim 4, including anode inserts disposed in some of said electrode chambers, said anode holder having a side facing said common multiple pseudo-spark chamber with slots formed therein between said anode inserts for enlarging the surface area of said anode holder.

6. An excitation circuit according to claim 1, wherein said multi-channel pseudo-spark switch has an anode holder having metal parts and insulating parts bordering said common multiple pseudo-spark chamber and having recesses formed therein, a main insulator fixed to said anode holder, and a shaped cathode body being common to all of said pseudo-spark switches and being elongated and approximately rectangular as seen in a plane view, said shaped cathode body having said electrode chambers comprising bores formed therein for spark channels of said individual pseudo-spark switches, and said shaped cathode body having ends and lateral surfaces with projections corresponding to and fitting into said recesses formed in said anode holder, for interrupting a line-of-sight connection of said common multiple pseudo-spark chamber to at least one of said parts of said anode holder and said main insulator.

7. An excitation circuit according to claim 1, wherein said electrode surfaces are anode surfaces and cathode surfaces, said multi-channel pseudo-spark switch has an anode holder bordering said anode surfaces, at least one of said electrode surfaces has a concave trough-like contour as viewed in the longitudinal direction of said common multiple pseudo-spark chamber, and said given distance between said electrodes is greatest in the vicinity of said electrode chambers.

8. An excitation circuit according to claim 1, wherein said electrode chambers are anode and cathode electrode chambers having wall portions being directly exposed to pseudo-sparks, and inserts disposed in at least one of said anode and cathode electrode chambers as protective linings, said inserts including a metal with a high melting point and a high resistance to sputtering.

9. An excitation circuit according to claim 8, wherein said anode chambers have a first portion with a first unobstructed width, and including a second expanded portion with a second unobstructed width being greater than said first unobstructed width, each of said second expanded portions of said anode chambers being adjacent a respective one of said first portions of said anode chambers forming a pseudo-spark partial chamber for each of said individual pseudo-spark switches.

10. An excitation circuit according to claim 8, wherein said cathode chambers have a first portion with a first unobstructed width, and including a second expanded portion of said cathode chambers with a second unobstructed width being greater than said first unobstructed width, each of said second expanded portions of said cathode chambers being adjacent a respective one of said first portions of said cathode chambers forming a pseudo-spark partial chamber in said hollow cathode of each of said individual pseudo-spark switches.

11. An excitation circuit according to claim 1, wherein said at least first and second network capacitors with said coatings and said intermediate dielectric layers thereof extend substantially normal to the optical axis of said laser chamber.

12. An excitation circuit for gas lasers operating according to the TE principle, comprising:

A) a gas laser housing with a laser chamber having first and second sides and, at least two laser electrodes disposed in said laser chamber for generating a homogeneous glow discharge between said laser electrodes;

B) a pulse forming network being connectable to a high voltage source at its input side and being connected to said laser electrodes at its output side and having a high anode potential, at least one fast acting high voltage switch connected to said pulse forming network at the input side thereof to be activated or fired for generating high voltage pulses at said laser electrodes with said pulse forming network;

C) means for preionizing the gas space of said laser chamber before the high voltage pulse applied to said laser electrodes reaches a firing threshold of the laser glow discharge;

D) said pulse forming network including at least first and second network capacitors and associated equivalent inductances of the excitation circuit;

E) said at least first and second network capacitors being connected within said pulse forming network and having first and second types of coatings with a given stacking direction and intermediate dielectric layers said coatings and said dielectric layers being stacked according to said stacking direction substantially normal to the optical axis of said laser chamber to form a stacked capacitor packet disposed in a part of said gas laser housing;

said switch being a multi-channel pseudo-spark switch having a longitudinal axis oriented parallel to the optical axis of said laser and including:

a) auxiliary and trigger electrodes, a plurality of individual pseudo-spark switches being electrically connected in parallel to each other and disposed sequentially in a line parallel to the laser axis, said individual pseudo-spark switches having mutually opposite electrode chambers disposed in pairs and a pair of anode and cathode electrodes having electrode surfaces and facing each other with their electrode surfaces;

b) said cathode electrodes of each of said individual pseudo-spark switches being connected to ground potential in said pulse forming network;

c) said anode electrodes of each of said individual pseudo-spark switches being distributed along the axial length of said capacitor packet and being connected to the high anode potential of said pulse forming network;

d) a common multiple pseudo-spark chamber having a housing disposed at said part of said gas laser housing containing said capacitor packet, said anode and cathode electrodes and said auxiliary and trigger electrodes being disposed within said common multiple pseudo-spark chamber; and e) said electrode surfaces of said multi-channel pseudo-spark have different polarities and face each other with a given distance therebetween, at least the distance of said electrode surfaces belonging to one of said polarities being increased in comparison to the distance of a plane parallel electrode configuration by a special shape in said given distance.

13. An excitation circuit according to claim 12, wherein said at least first and second network capacitors with said coatings and said intervening dielectric layers thereof run in planes disposed substantially parallel to the optical axis of said laser chamber, and said coatings have a stacking direction substantially normal to the optical axis of said laser chamber for a plane laser configuration selected from the group consisting of LC inversion, charge transfer and inversion charge transfer circuits.

* * * * *